United States Patent
Jones et al.

[11] Patent Number: 5,920,175
[45] Date of Patent: Jul. 6, 1999

[54] INSTANTANEOUS POSITION INDICATING APPARATUS FOR A SENSORLESS SWITCHED RELUCTANCE MACHINE SYSTEM

[75] Inventors: Stephen R. Jones, Winnebago; Barry T. Drager, Rockford, both of Ill.

[73] Assignee: Sundstrand Corporation, Rockford, Ill.

[21] Appl. No.: 08/630,102

[22] Filed: Apr. 9, 1996

[51] Int. Cl.⁶ ........................................... H02P 7/05
[52] U.S. Cl. .................. 318/701; 318/603; 318/254; 318/616
[58] Field of Search .................. 364/167.01, 474.31, 364/474.28; 318/701, 632, 254, 573, 601, 600, 603, 592, 616; 369/44.13, 44.26, 44.34, 105

[56] References Cited

U.S. PATENT DOCUMENTS

| | | | |
|---|---|---|---|
| 4,331,924 | 5/1982 | Elliott et al. ........................ | 377/47 |
| 4,374,351 | 2/1983 | Fishman et al. .................... | 318/603 |
| 4,455,513 | 6/1984 | Fulton et al. ...................... | 318/138 |
| 4,553,078 | 11/1985 | Wise .................................. | 318/592 |
| 4,611,157 | 9/1986 | Miller et al. ....................... | 318/696 |
| 4,642,543 | 2/1987 | MacMinn ........................... | 318/696 |
| 4,772,839 | 9/1988 | MacMinn et al. ................. | 318/696 |
| 4,825,055 | 4/1989 | Pollack .............................. | 235/411 |
| 4,959,596 | 9/1990 | MacMinn et al. ................. | 318/254 |
| 4,959,823 | 9/1990 | Getreuer et al. .................. | 369/109 |
| 5,070,007 | 12/1991 | Van Zanten et al. ............. | 364/574 |
| 5,097,190 | 3/1992 | Lyons et al. ...................... | 318/701 |
| 5,105,137 | 4/1992 | Iijima ................................. | 318/568 |
| 5,107,195 | 4/1992 | Lyons et al. ...................... | 318/701 |
| 5,115,180 | 5/1992 | Chung ............................... | 318/618 |
| 5,140,243 | 8/1992 | Lyons et al. ...................... | 318/701 |
| 5,140,244 | 8/1992 | Lyons et al. ...................... | 318/701 |
| 5,144,564 | 9/1992 | Naido et al. ...................... | 364/494 |
| 5,159,254 | 10/1992 | Teshima ............................ | 318/611 |
| 5,165,051 | 11/1992 | Kumar ............................... | 324/79 |

(List continued on next page.)

FOREIGN PATENT DOCUMENTS

| | | |
|---|---|---|
| 276625 | 8/1988 | European Pat. Off. . |
| 401818 | 12/1990 | European Pat. Off. . |
| WO 94 11945 | 5/1994 | WIPO . |
| WO 97 38484 | 10/1997 | WIPO . |

OTHER PUBLICATIONS

Reynolds et al, "Robust Estimation of Covariance Matrices", IEEE Transactions on Automatic Control, Sep. 9, 1990.

N.M. Mvungi et al., "Sensorless Rotor Position in an SR Motor", European Conference on Power Electronics and Application, Sep. 3–6, 1991.

Ertugrul et al., "Real–Time Estimation of Rotor Position in PM Motors During Transient Operation", The European Power Electronics Association, 1993.

Jones et al., "Performance of a High Speed Switched Reluctance Starter/Generator System Using Electronic Position Sensing", Recor d of the Industry Applications Conference, Oct. 8–12, 1995.

Ramoni et al., "New Communication Methods in Switched Reluctance Motors Based on Active Phase Vectors", Proceedings of the Annual Power Electronics Specialists Conference, Jun. 20–24, 1994.

(List continued on next page.)

*Primary Examiner*—John W. Cabeca
*Attorney, Agent, or Firm*—Marshall, O'Toole, Gerstein, Murray & Borun

[57] ABSTRACT

A sensorless control for operating an inverter coupled to a switched reluctance machine includes an instantaneous position generation circuit that develops a signal for controlling commutation of the switched reluctance machine. The instantaneous position generation circuit includes a digitally controlled counter which provides a direct interface between a position estimation circuit and commutation logic for the inverter.

10 Claims, 6 Drawing Sheets

U.S. PATENT DOCUMENTS

| | | | |
|---|---|---|---|
| 5,173,650 | 12/1992 | Heglund | 318/701 |
| 5,196,775 | 3/1993 | Harris et al. | 318/560 |
| 5,248,921 | 9/1993 | Kato et al. | 318/560 |
| 5,291,115 | 3/1994 | Ehsani | 318/701 |
| 5,296,785 | 3/1994 | Miller | 318/254 |
| 5,296,794 | 3/1994 | Lang et al. | 318/715 |
| 5,325,026 | 6/1994 | Lyons et al. | 318/254 |
| 5,332,955 | 7/1994 | Hopper | 318/632 |
| 5,381,081 | 1/1995 | Radun | 318/701 |
| 5,394,323 | 2/1995 | Yellowley et al. | 318/573 |
| 5,404,091 | 4/1995 | Radun et al. | 318/701 |
| 5,448,149 | 9/1995 | Ehsani et al. | 318/701 |
| 5,467,025 | 11/1995 | Ray | 324/772 |
| 5,488,531 | 1/1996 | Aldridge et al. | 363/56 |
| 5,491,622 | 2/1996 | Carosa | 363/56 |
| 5,493,195 | 2/1996 | Heglund et al. | 318/701 |
| 5,499,186 | 3/1996 | Carosa | 363/56 |
| 5,525,886 | 6/1996 | Lyons et al. | 318/701 |
| 5,627,444 | 5/1997 | Fulks | 318/701 |
| 5,637,974 | 6/1997 | McCann | 318/701 |

OTHER PUBLICATIONS

Panda et al., "Further Developments in Indirect–Rotor Position Sensing of Variable–Reluctance Motors Using Wave Form Detection Technique", Power Electronics, Nov. 15–19, 1993.

Ehsani et al., "An Analysis of the Error in Indirect Rotor Position Sensing of Switched Reluctance Motors", Proceedings of the International Conference on Industrial Electronic Control and Instrumentation, Nov. 1, 1991.

Bado et al., "Effective Estimation of Speed and Rotor Position of a PM Synchronous Motor Drive by a Kalman Filtering Technique", Proceedings of the Annual Power Electronics Specialists Conference, Jun. 29–Jul. 3, 1992.

Lyons et al., "Flux/Current Methods for SRM Rotor Position Estimation", Proceedings of the Industry Applications Society Annual Meeting, Sep. 28–Oct. 1, 1991.

Caileux et al., "Effect of the Sampling and the Phase Communication in Nonlinear Position Control of a Switched Reluctance Motor–Analysis and Compensation", Proceedings of the $32^{nd}$ Conference on Design and Control, Dec. 1993.

Design and Implementation of a Five Horsepower, Switched Reluctance, Fuel–Lube, Pump Motor Drive for a Gas Turbine Engine written by Caio A. Ferreira, Stephen R. Jones, Barry T. Drager and William S. Heglund, IEEE Ninth Annual Applied Power Electronics Conference and Exposition, Feb. 13–17, 1994.

Practical Indirect Position Sensing for a Variable Reluctance Motor written by Walter D. Harris and submitted to the Massachusetts Institute of Technology, May 1987.

A Simple Motion Estimator for Variable–Reluctance Motors, written by Walter D. Harris and Jeffrey H. Lang, published in IEEE, vol. 26, No. 2. Mar./Apr. 1990.

Low Cost Sensorless Switched Reluctance Motor Drives For Automotive Applications written by M. Ehsani and I. Husain, (members IEEE) Power Electronics Laboratory, Dept. Of Electrical Engineering, Texas A&M University, College Station, TX. pp. 96–101.

Application of Sensor Integration Techniques to Switched Reluctance Motor Drives written by Stephen R. MacMinn, William J. Rzesos, Paul M. Szczesny and Thomas M. Jahns, published in IEEE vol. 28, No. 6, Nov./Dec. 1992.

An Analysis of the Error in Indirect Rotor Position Sensing of Switched Reluctance Motors, written by M. Ehsani, I. Husain and K.R. Ramani, Department of Electrical Engineering, Texas A&M University, College Station, Texas.

A Comparative Analysis of SRM Discrete Shaft Position Sensor Elimination by FM Encoder and Pulsed Impedance Sensing Schemes, written by M. Ehsani, Dept. of Electrical Engineering, Texas A&M University, College Station, Texas.

New Modulation Encoding Techniques for Indirect Rotor Position Sensing in Switched Reluctance Motors, written by Mehrdad Ehsani, Iqbal Husain, S. Mahajan, and K.R. Ramani, published in IEEE, vol. 30, No. 1, Jan./Feb. 1994.

Flux/Current Methods for SRM Rotor Position Estimation, written by J.P. Lyons, S.R. MacMinn and M.A. Preston, published in May 1991 IEEE.

INSTANTANEOUS POSITION INDICATING APPARATUS FOR A SENSORLESS SWITCHED RELUCTANCE MACHINE SYSTEM

BACKGROUND AND SUMMARY OF INVENTION

The present invention relates generally to motors/generators and, more particularly, to high speed switched reluctance machines capable of starting a prime mover as well as generating electrical power for use on aircraft.

The aerospace industry has consistently driven the leading edge of technology with the requirement for lightweight, high efficiency, high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

For aircraft electric power generation systems, these pressures have precipitated great advancements in technology, but have also caused problems. Aircraft have typically used synchronous brushless AC generators or permanent magnet generators for electric power generation needs. Unfortunately, both of these types of generators require components which can fail due to the conditions under which they are required to operate (usually mounted directly on the aircraft jet engine).

In addition to an electrical generator, an engine starter is also typically installed on the aircraft engine. This component is used only during starting, which occupies only a very small fraction of each operational cycle of the aircraft. In effect, the starter becomes excess baggage during the remainder of the flight, increasing overall weight, fuel burn, and cost of ownership, and decreasing overall range. This problem has been recognized and efforts have been expended to combine the starter and generator into a single package, thus eliminating the need for an additional piece of equipment used only a fraction of a percent of the time. Unfortunately, using synchronous AC or permanent magnet generators for this purpose, in addition to creating new problems associated with the start function, does not eliminate the inherent problems with these machines as described above.

As an alternative to the use of the synchronous AC or the permanent magnet generator for this combined starter/generator function, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost without the containment problems associated with rotor windings or permanent magnets. Further, the rotor does not require rotating rectifiers, which contribute to failures, as does the AC synchronous machine.

In order to properly operate a switched reluctance machine, it has been found necessary in the past to determine the rotor position in order to properly commutate the currents flowing in the phase windings of the machine. Resolvers are used, particularly in high speed systems, or sometimes encoders in lower speed systems, to obtain a measure of rotor position. However, resolvers and required associated apparatus (chiefly, a resolver-to-digital converter and an excitation circuit) are expensive and both resolvers and encoders are sources of single point failure.

In order to obviate the need for position sensors, such as resolvers or encoders, sensorless operational techniques have been developed. The most trivial solution to sensorless operation is to control the switched reluctance machine as a stepper motor in the fashion disclosed in Bass, et al. U.S. Pat. No. 4,611,157 and MacMinn U.S. Pat. No. 4,642,543. In an alternative technique, machine inductance or reluctance is detected and utilized to estimate rotor position. Specifically, because the phase inductance of a switched reluctance machine varies as a function of angle from alignment of the stator pole for that phase and a rotor pole, a measurement of instantaneous phase inductance can be utilized to derive an estimate of rotor position. See MacMinn, et al. U.S. Pat. No. 4,772,839, MacMinn, et al. U.S. Pat. No. 4,959,596, Harris "Practical Indirect Position Sensing for a Variable Reluctance Motor," Masters of Science Thesis, MIT, May 1987, Harris, et al. "A Simple Motion Estimator for Variable Reluctance Motors," IEEE Transactions on Industrial Applications, Vol. 26, No. 2, March/April, 1990, and MacMinn, et al. "Application of Sensor Integration Techniques to Switched Reluctance Motor Drives," IEEE Transactions on Industry Applications, Vol. 28, No. 6, November/December, 1992.

In a further technique, phase inductance can be determined using a frequency modulation approach whereby a non-torque producing phase forms part of a frequency modulation encoder. See Ehsani, et al. "Low Cost Sensorless Switched Reluctance Motor Drives for Automotive Applications," Texas A&M Power Electronics Laboratory Report (date unknown), Ehsani, et al. "An Analysis of the Error in Indirect Rotor Position Sensing of Switched Reluctance Motors," IEEE Proceedings IECON '91, Ehsani "A Comparative Analysis of SRM Discrete Shaft Position Sensor Elimination by FM Encoder and Pulsed Impedance Sensing Schemes," Texas A&M Power Electronics Laboratory Report, (date unknown) and Ehsani, et al. "New Modulation Encoding Techniques for Indirect Rotor Position Sensing in Switched Reluctance Motors," IEEE Transactions on Industry Applications, Vol. 30, No. 1, January/February, 1994.

A model-based approach to rotor position estimation has been developed by General Electric Company and is disclosed in Lyons, et al. "Flux/Current Methods for SRM Rotor Position Estimation," Proceedings of IEEE Industry Applications Society Annual Meeting, Vol. 1, 1991, and Lyons, et al. U.S. Pat. No. 5,097,190. In this technique, a multi-phase lumped parameter model of the switched reluctance machine is developed and utilized. However, the model has been developed only for a three-phase machine wound in a north-south-north-south-north-south configuration.

A position estimation subsystem has been developed by the assignee of the instant application and includes a relative angle estimation circuit, an angle combination circuit and an estimator including a Kalman filter. The relative angle estimation logic is responsive to the phase current magnitudes of the switched reluctance machine and develops an angle estimate for each phase. The angle combination logic combines the phase angle estimates to obtain an absolute angle estimate which eliminates ambiguities that would otherwise be present. The estimator utilizes a model of the switched reluctance machine system as well as the absolute angle estimate to form a better estimate of the rotor position and velocity and, if necessary or desirable for other purposes, the rotor acceleration.

The simplest approach is to utilize the estimated rotor position developed by the Kalman filter to directly control commutation. However, estimation of rotor position takes a finite time to calculate and thus, there is a maximum rate at which the calculation can be performed. There is also a processing delay during which the rotor will have turned through some angle depending upon the velocity thereof. Ultimately, the processing cannot be performed fast enough to give the required angular resolution. For example, at 3600 rpm, it takes 46.3 microseconds for the rotor to rotate one mechanical degree. Thus, if the requirement is for one mechanical degree of accuracy, then there is an upper limit set on the maximum rotor speed and/or maximum processing time.

At a minimum, the Kalman filter requires an update rate of twice per electrical cycle so that the rotor velocity can be correctly estimated without aliasing effects. In a 6,4 machine, for example, (i.e., a machine having six stator poles and four rotor poles) this leads to a rotor position estimate update every 45 mechanical degrees of rotation. This amount of rotation, however, is obviously too coarse for use directly by the commutation circuitry.

The object of the present invention is to provide an instantaneous position generation circuit which converts the coarse sampled output of the Kalman filter into a signal having position update intervals which are sufficiently fine to properly control commutation. It is further an object to accomplish the foregoing using circuitry which is simple, reliable and low in cost.

These and other objects and advantages are attained by the provision of instantaneous position generation circuitry including a digitally controlled counter (DCC) which is incremented as a function of estimated rotor velocity of the switched reluctance machine. An output of the DCC is fed back to modify the counter increment to insure that the output of the counter tracks the estimated rotor position accurately.

Preferably, the DCC includes an accumulator having inputs adapted to receive data words each expressed in a relatively large number of bits and further includes an output at which output data words also expressed in a relatively large number of bits are developed. Also preferably, the accumulator is of the high speed type. These features permit the counter to properly control commutation circuitry, even under high speed conditions.

Also in accordance with the preferred embodiment, the accumulator is capable of counting in either of up and down directions and hence the circuit provides compatibility with systems that can operate bidirectionally.

Still further in accordance with the preferred embodiment, the digitally controlled counter has the capability to preload bits at any time during operation so that the counter output can be initialized.

The instantaneous position generation circuitry provides a direct interface between the Kalman filter and commutation logic for a switched reluctance control system. The use of a DCC avoids the need to use voltage controlled oscillators or an array of timers, each of which requires updating before the next commutation instant. In addition, the DCC comprises an easily interfaced replacement for the output of a resolver-to-digital converter.

These and other objects, advantages and novel features of the present invention will become apparent to those skilled in the art from the drawings and following detailed description.

DESCRIPTION OF THE PREFERRED EMBODIMENTS

Figure 1:
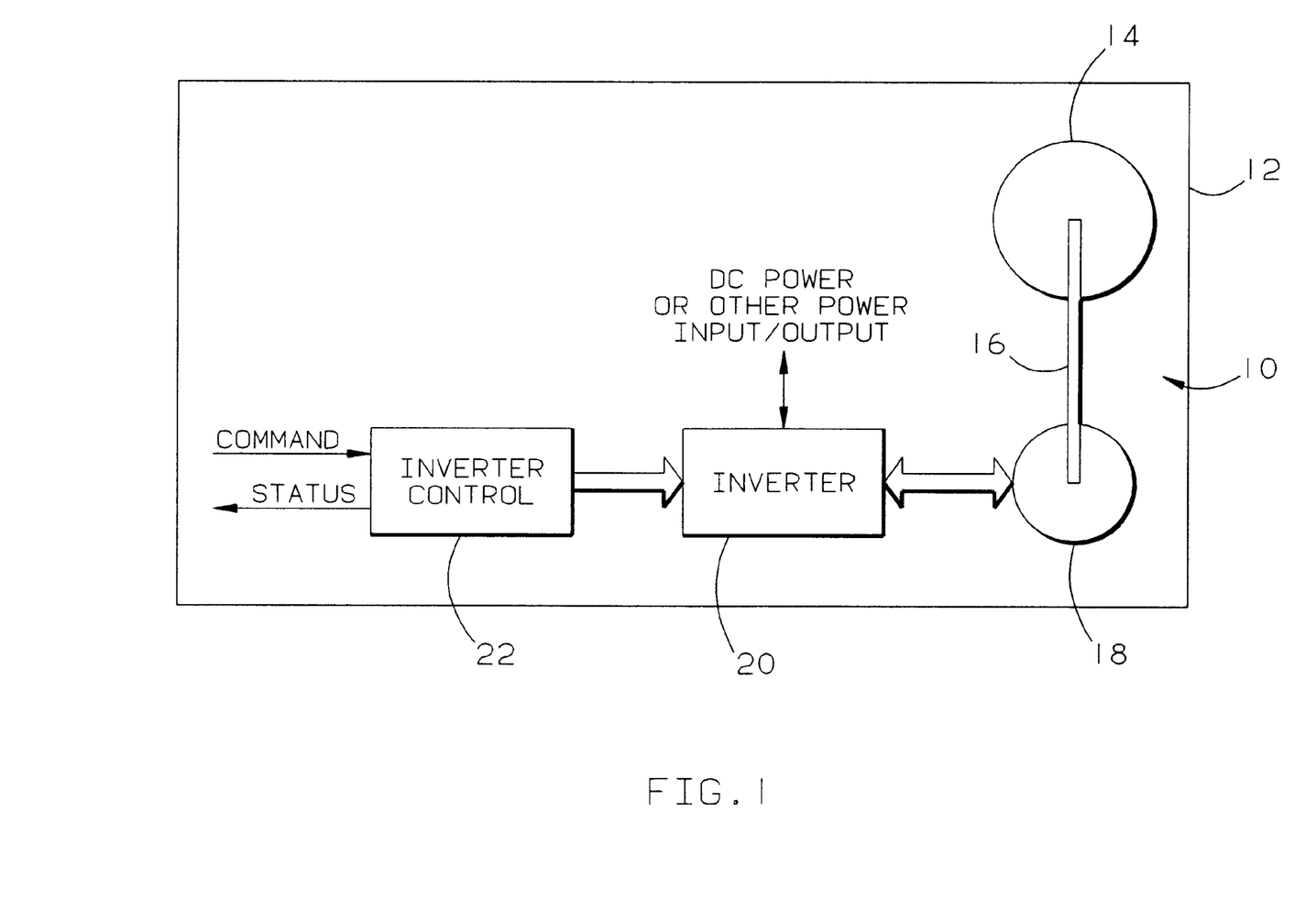
FIG. 1 comprises a block diagram of a starting/generating system for an aircraft.

Referring first to FIG. 1, a power conversion system 10 is provided on-board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to an inverter 20 operated by an inverter control 22. In a starting mode of operation, DC power is supplied to the inverter 20 and the inverter control 22 develops control signals for switches in the inverter 20 to cause the switched reluctance machine 18 to operate as a motor and supply motive power via the shaft 16 to the gas turbine engine 14 for starting purposes. During operation in a generating mode, motive power is supplied by the gas turbine engine to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant frequency AC power for one or more AC loads.

Figure 2:
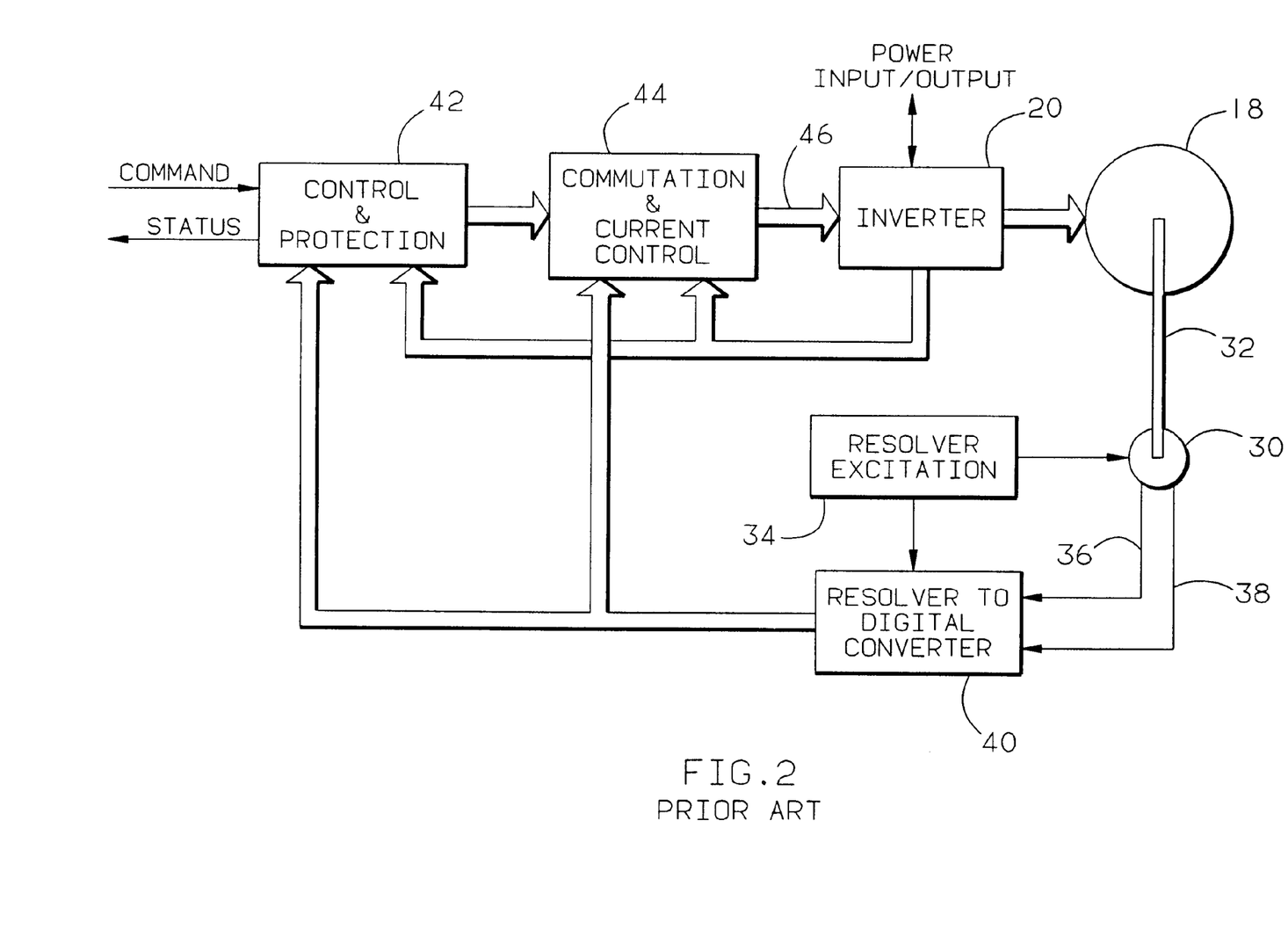
FIG. 2 comprises a block diagram of a prior art inverter control, inverter and switched reluctance machine.

Referring now to FIG. 2, a prior art inverter control for operating the switched reluctance machine 18 includes a resolver 30, which is coupled by a motive power shaft 32 to the rotor of the switched reluctance machine 18. Excitation is provided by a resolver excitation circuit 34. The resolver 30 develops first and second signals over lines 36, 38 that have a phase quadrature relationship (also referred to as sine and cosine signals). A resolver-to-digital converter 40 is responsive to the magnitudes of the signals on the lines 36 and 38 and develops a digital output representing the position of the rotor of the switched reluctance machine 18. The position signals are supplied along with a signal representing machine rotor velocity to a control and protection circuit 42. The rotor position signals are also supplied to a commutation and current control circuit 44 having an input coupled to an output of the control and protection circuit 42.

The circuits 42 and 44 further receive phase current magnitude signals as developed by the inverter 20. The circuits 42 and 44 develop switch drive signals on lines 46 for the inverter 20 so that the phase currents flowing in the windings of the switched reluctance machine 18 are properly commutated.

As noted previously, the resolver 30 is expensive and inherently a source of single point failure. Further, the resolver-to-digital converter 40 is also an expensive component and, hence, it is desirable to eliminate these and other components (including the excitation circuit 34), if possible.

Figure 3:
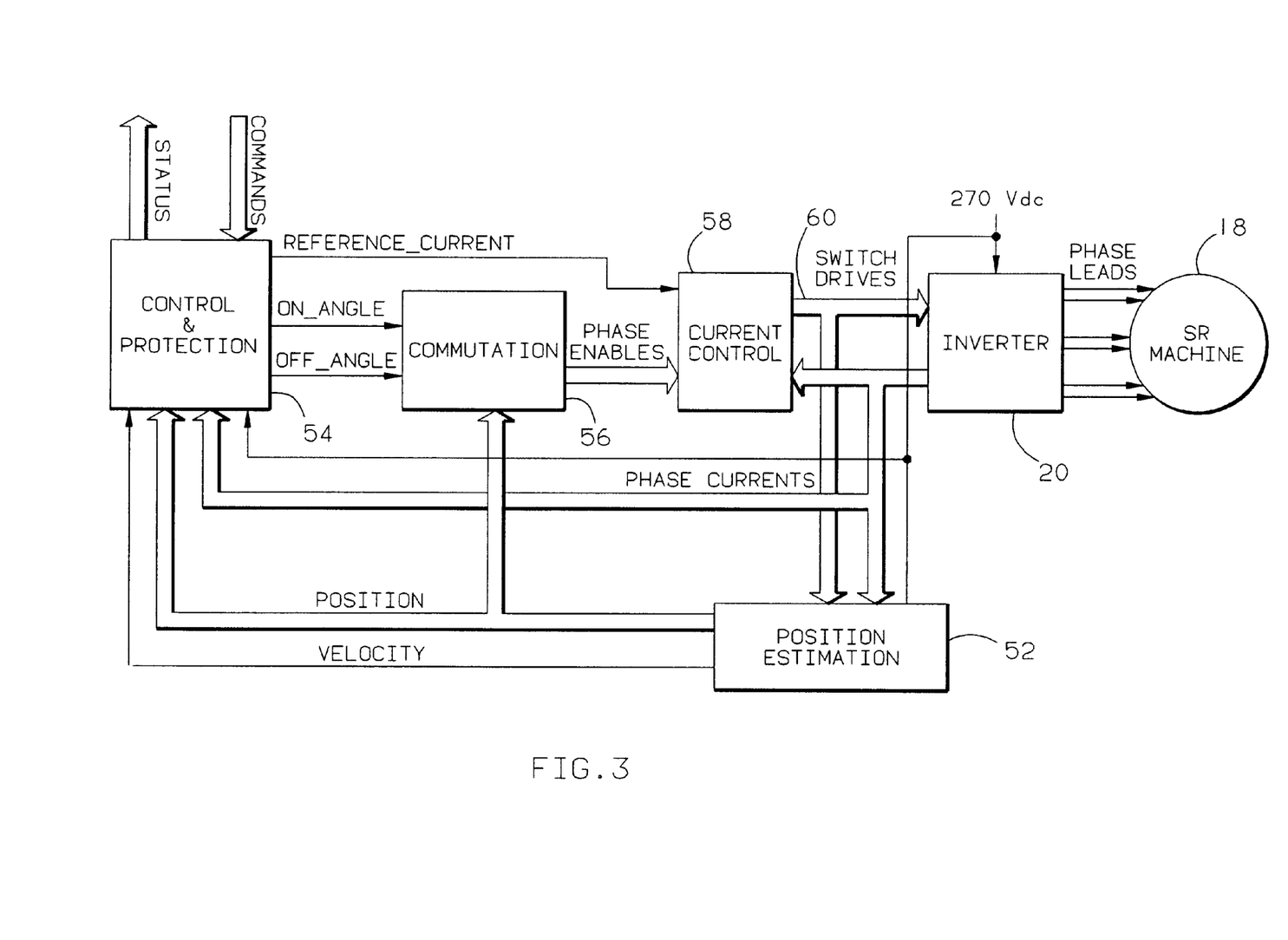
FIG. 3 comprises a block diagram of an inverter control incorporating the present invention together with an inverter and a switched reluctance machine.

FIG. 3 illustrates an inverter control 50 that incorporates the present invention together with the inverter 20 and the switched reluctance machine 18. A position estimation circuit 52 is responsive to the phase current magnitudes developed by the inverter 20, switch control or drive signals for switches in the inverter 20 and DC bus voltage magnitude to develop position and velocity estimate signals for a control and protection circuit 54. In addition, the position estimate signals are supplied to a commutation circuit 56. A current control circuit 58 is responsive to the phase current magnitudes developed by the inverter 20, as well as phase enable output signals developed by the commutation circuit 56 and a reference current signal developed by the control and protection circuit 54. The current control circuit 58 produces the switch control or drive signals on lines 60 for the inverter 20.

Figure 4:
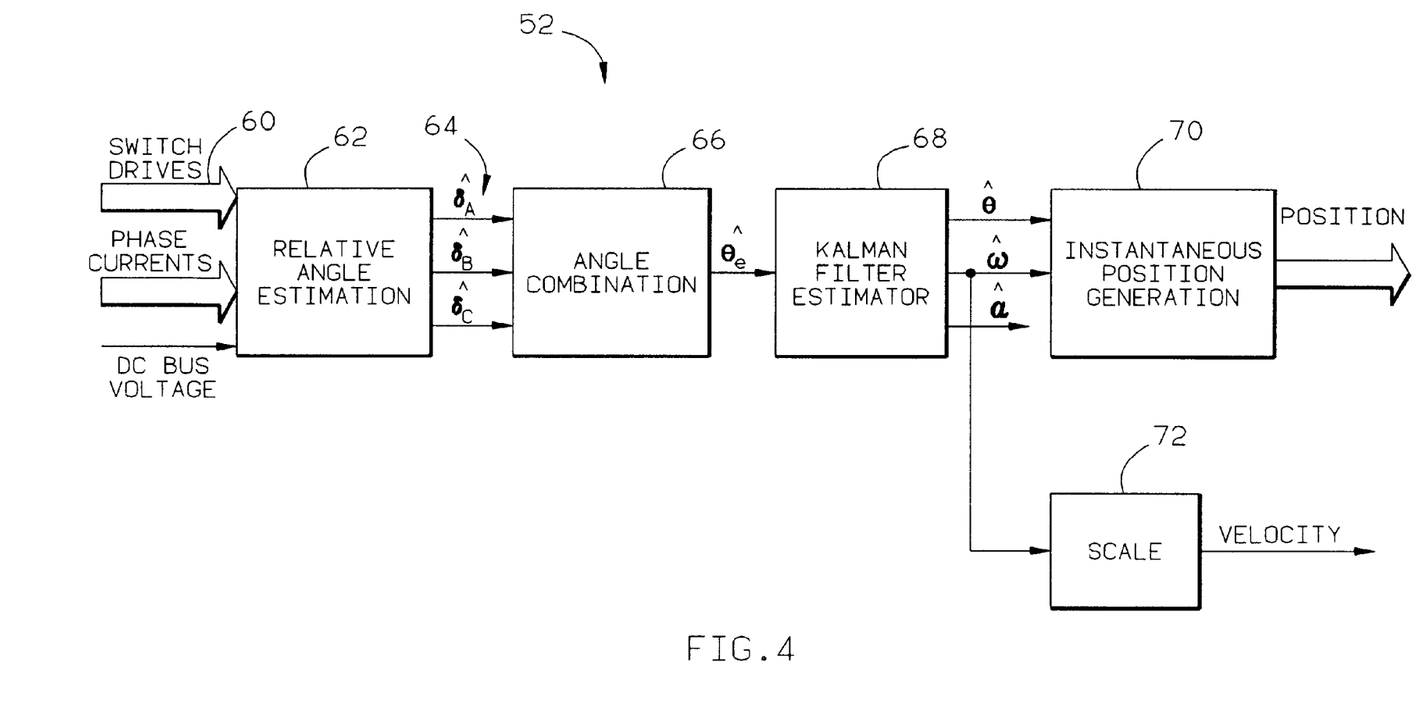
FIG. 4 comprises a block diagram of the position estimation logic of FIG. 3.

FIG. 4 illustrates the position estimation circuit 52 in greater detail. A relative angle estimation logic circuit 62 is responsive to the switch drive signals, the DC bus voltage and the phase current magnitudes developed by the inverter 20 and develops a set of output signals $\hat{\delta}_A$, $\hat{\delta}_B$, $\hat{\delta}_C$ on lines 64 each representing an estimate of instantaneous angle from rotor/stator pole alignment for a particular phase of the machine 18. It should be noted that, while three angle estimate signals $\hat{\delta}_A$, $\hat{\delta}_B$, $\hat{\delta}_C$ are developed by the circuit 62 of FIG. 4 wherein each represents the estimated instantaneous angle for the phases of a three-phase switched reluctance machine 18, a different number of signals would be developed on the lines 64 if the machine has a different number of phases, one for each of the machine phases.

Each angle estimate signal $\hat{\delta}_A$, $\hat{\delta}_B$, $\hat{\delta}_C$ represents two possible solutions for estimated rotor position, either phase advanced with respect to (i.e., moving toward) the respective phase pole or phase delayed with respect to (i.e., moving away from) the respective phase pole. This ambiguity is removed by an angle combination circuit 66 which combines the signals $\hat{\delta}_A$, $\hat{\delta}_B$, $\hat{\delta}_C$ to obtain an absolute angle estimate $\hat{\theta}_e$. The angle estimate $\hat{\theta}_e$ is provided to an estimator 68, preferably including a Kalman filter, which improves the estimate of rotor position to obtain a machine position indication or value $\hat{\theta}$. In addition, the estimator 68 develops a velocity indication in the form of an estimate $\hat{\omega}$ and further develops an estimated acceleration signal $\hat{\alpha}$ representing the estimated acceleration of the machine rotor. The acceleration signal $\hat{\alpha}$ may be used by other circuits (not shown). The signals $\hat{\theta}$ and $\hat{\omega}$ are supplied to an instantaneous position generation circuit 70 according to the present invention.

If desired, the estimator 68 may include an implementation other than a Kalman filter.

The signal $\hat{\omega}$ is further supplied to a scaling circuit 72 which in turn develops a velocity estimate signal in the correct units (e.g., rpm's) for the control and protection circuit 54 of FIG. 3.

As noted above, it would be simplest if the output of the estimator 68 could be used to provide command signals for the commutation circuit 56 of FIG. 3. However, the estimator 68 cannot develop position and speed estimates at sufficiently short update intervals. The instantaneous position generation circuit 70 develops a machine position signal representing a series of machine position indications or estimations of rotor position at a position update rate greater than the update rate of the output of the Kalman filter so that the commutation circuit 56 can be operated in a proper manner.

Figure 5:
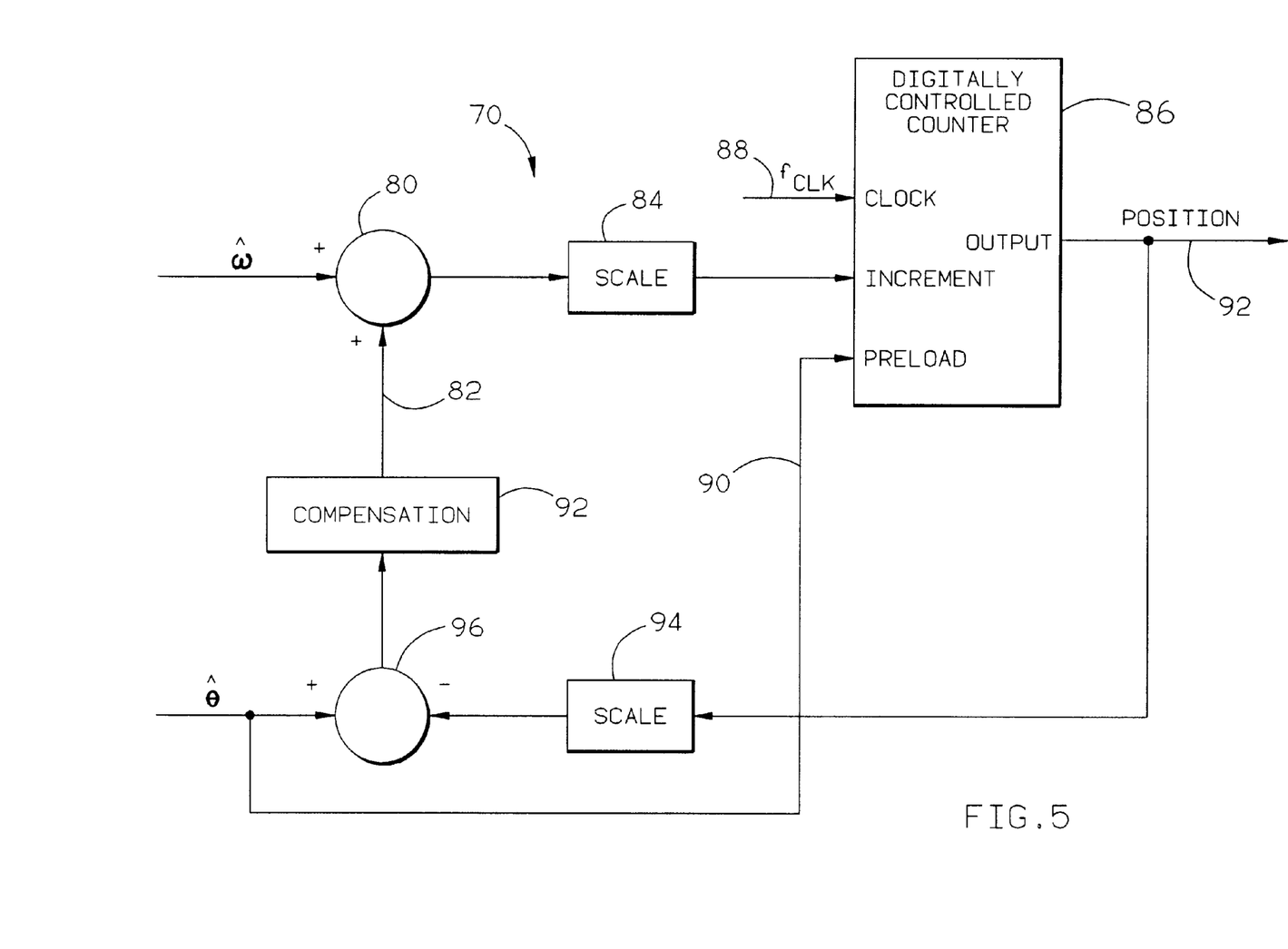
FIG. 5 comprises a block diagram of the instantaneous position generation logic of FIG. 4 according to the present invention.

As seen in FIG. 5, the instantaneous position generation circuit 70 includes a first summer 80 having a noninverting input that receives the signal $\hat{\omega}$. The signal $\hat{\omega}$ is summed by the summer 80 with a feedback signal on a line 82 and the resulting summed signal is supplied to a scaling circuit 84 that in turn develops a signal for an increment input of a digitally controlled counter (DCC) 86. The DCC 86 further includes a clock input that receives a clock signal $f_{CLK}$ at a fixed frequency over a line 88 and a preload input which receives the signal $\hat{\theta}$ from the Kalman filter 68 of FIG. 4 over a line 90. The DCC 86 further includes an output coupled to a line 92 at which the position estimate signal is developed.

The signal on the line 92 is supplied to a scaling circuit 94 having an output coupled to an inverting input of a further summer 96. A noninverting input of the summer 96 receives the signal $\hat{\theta}$ from the Kalman filter 68 of FIG. 4 and the resulting summed signal is supplied via a compensation circuit 98 to the second non-inverting input of the summer 80 over the line 82.

The digitally controlled counter 86 is clocked by the signal $f_{CLK}$ on the line 88 at a fixed frequency of several Megahertz and the output of the DCC 86 is incremented at each clock pulse by the value appearing at the output of the scaling circuit 84. The scaling circuit 94 and the summer 96 together develop an error signal representing the difference between the signal $\hat{\theta}$ (i.e., the position estimate developed by the estimator 68) and the scaled position signal developed by the counter 86. The compensation circuit 92 preferably provides proportional gain and the compensated error signal on the line 82 is added to the estimated rotor velocity $\hat{\omega}$. The feedback circuit consisting of the elements 94, 96 and 92 thus insures that the output of the DCC 86 accurately tracks the estimated rotor position $\hat{\theta}$.

To avoid wrap-around problems, the error signal developed by the summer 96 is taken in a modulo fashion in the range between $-\pi$ and $\pi$ radians to insure that the output of the summer 96 is within the required numerical range.

Figure 6:
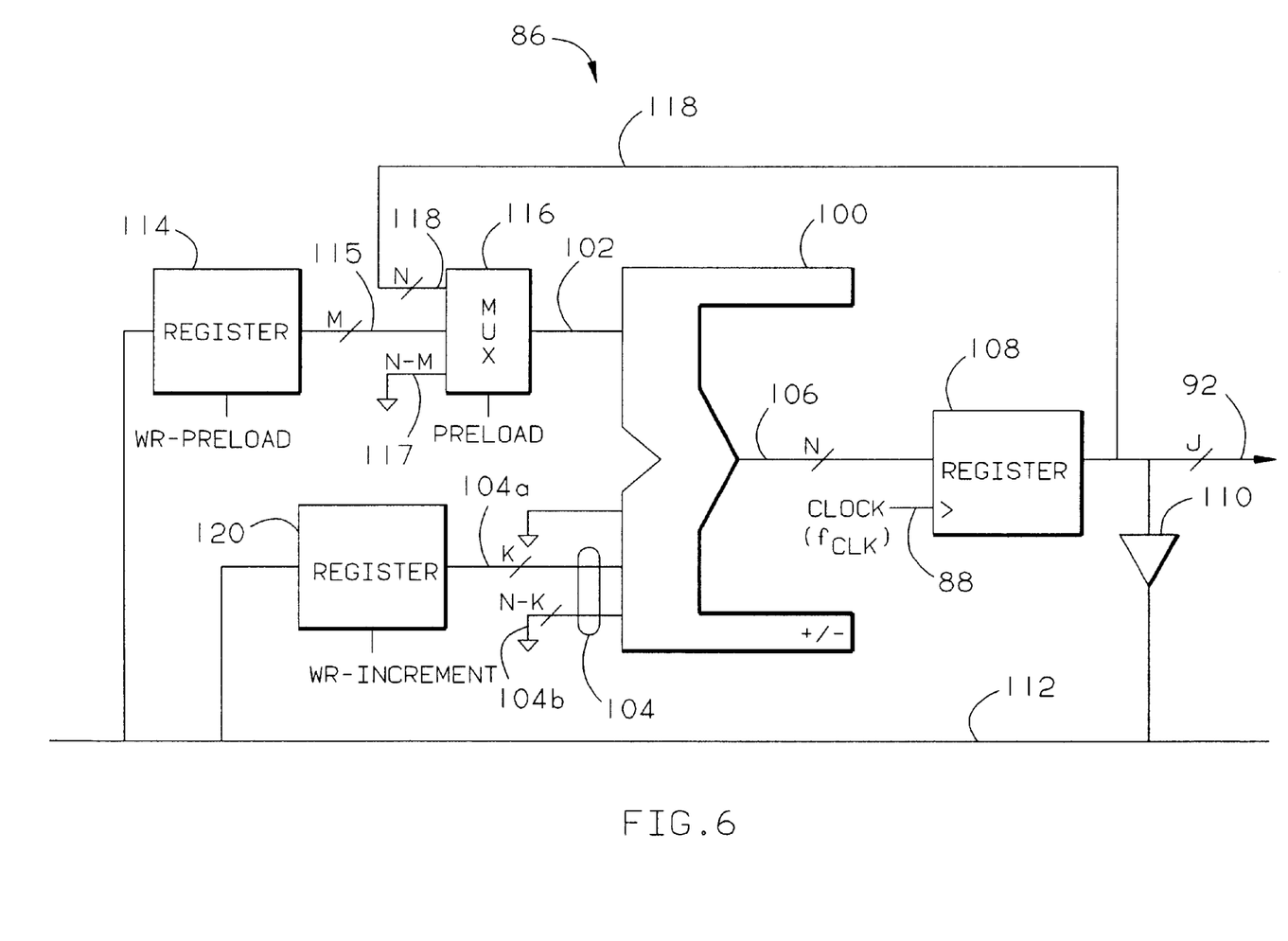
FIG. 6 comprises a block diagram of the digitally controlled counter of FIG. 5.

FIG. 6 illustrates the DCC 86 in greater detail. It should be noted that the circuits 70 and 86 of FIGS. 5 and 6 are preferably implemented by hardware. However, these circuits may alternatively be implemented by software executed by, for example, a digital signal processor (DSP), or may be implemented by a combination of hardware and software.

As seen in FIG. 6, the operation of the digitally controlled counter 86 is governed by the following equation:

$$f_{out} = (INC.) \frac{f_{CLK}}{2^N}$$

Where INC. is the input value necessary to obtain the required output frequency $f_{out}$ for an accumulator of size N bits with an input clock frequency of $f_{CLK}$ Hertz.

The DCC 86 includes an accumulator 100 of the two's-complement type that accepts first and second addition terms on lines 102, 104 and develops an output on a line 106. In accordance with the preferred embodiment, each word appearing on the lines 102 and 106 is N bits in width. The lines 104 comprise first and second sets 104a, 104b, wherein the set 104a receives data words each N-K bits in width where each bit is zero and forming upper order or most significant bits and wherein the set 104b receives data words each K bits in width and forming lower order or least significant bits. The output developed on the line 106 is latched by a register 108, which is clocked by the signal $f_{CLK}$ on the line 88. The rotor position signal on the line 92 comprises the J most significant bits of the data words developed at the output of the register 108.

The rotor position signal on the line 92 is provided by a tri-state buffer 110 to a data bus 112. The signals supplied to the increment and preload inputs of the DCC 86 as seen in FIG. 6 are also transmitted over the data bus 112. A further register 114 is coupled to the data bus 112 and provides an M-bit data word representing a preload (or initialization) value to a first set of inputs 115 of a multiplexer 116 in response to a clocking signal WR_PRELOAD. The multiplexer 116 includes a second set of inputs 117 that receives data words each N-M bits in width where each bit is zero. Each data word appearing at the first set of inputs 115 comprises upper order or most significant bits of one of a series of first N-bit multiplexed input words for the multiplexer 116 and each data word appearing at the second set of inputs 117 comprises lower order or least significant bits of one of the series of first N-bit multiplexed input words for the multiplexer 116. A third set of inputs 118 receives a second series of N-bit multiplexed input words comprising the N-bit data words developed at the output of the register 108. The multiplexer 116 provides either the first or second series of N-bit multiplexed input words to the accumulator 100 over the lines 102 in dependence upon the state of a signal PRELOAD developed by the DSP. Specifically, if PRELOAD is in a first state, the first series of multiplexed input words is provided to the accumulator 100 while the second series of multiplexed input words is provided to the accumulator 100 if PRELOAD is in a second state. A third register 120 provides the K-bit signal to the lines 104b from the data bus 112 in response to a clocking signal WR_INCREMENT developed by the DSP.

When the DCC 86 is to be initialized, an M-bit preload value is developed on the data bus 112 by the DSP and the signals WR_PRELOAD and PRELOAD assume states which cause a data word to be supplied over the lines 102 having M higher order bits equal to the M-bit preload value and N-M lower order bits each equal to zero. Thereafter, the signal WR_INCREMENT is caused to assume a state to transfer data appearing on the bus 112 and representing current machine speed to the K lower order bits on the lines 104b.

Following initialization, the signals WR_PRELOAD, PRELOAD and WR_INCREMENT switch to appropriate states so that the multiplexer 116 provides the N-bit words from the register 108 to the lines 102 and so that K-bit increment words developed on the data bus 112 by the DSP are provided as the K lower order bits on the lines 104b. The accumulator 100 thus increments according to the output of the scaling circuit 84 of FIG. 5 as described above. Further, if a negative two's complement number is loaded into the register 120 in response to the WR_INCREMENT clocking signal, the accumulator 100 will decrement (rather than increment) according to the output of the scaling circuit 84. This results in the capability of bidirectional operation.

In the preferred embodiment, the values for N, K, M and J are as follows:

N=27, K=16, M=16, J=10

Of course, the above values can be varied as necessary or desirable. It is only necessary that the accumulator be wide enough and be capable of sufficient speed to allow control over a high speed switched reluctance machine.

The programmable increment and decrement rates are used during normal operation of the system to update the position output. The increment and decrement rates represent the velocity of the machine. During normal operation, the position output of the DCC 86 is only affected by the velocity (i.e., the increment or decrement rates) of the system, and will track the position accordingly.

In addition to the capability to preload during initialization, preload can occur when the position estimation algorithm has lost synchronization and is reacquiring control.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. Apparatus for converting a first machine position signal representing a series of indications of position of a machine at a first position update rate into a second machine position signal representing a series of machine position indications at a second position update rate greater than the first position update rate, comprising:

a counter having a clock input responsive to a clock signal, an increment input and an output at which the second machine position signal is developed; and means responsive to the first machine position signal and coupled to the increment input of the counter for deriving an increment signal for the counter.

2. The apparatus of claim 1, wherein the counter comprises a digitally controlled counter (DCC).

3. The apparatus of claim 2, wherein a machine speed signal is developed representing a series of indications of machine speed and wherein the deriving means includes means for summing the machine speed signal with an error signal representing a difference between the first and second machine position signals.

4. The apparatus of claim 3, wherein the DCC includes an accumulator having addition inputs and an output and wherein the output of the accumulator is coupled to one of the addition inputs and the other of the addition inputs receives the increment signal.

5. The apparatus of claim 1, further including means for preloading an initialization value into the counter.

6. In a sensorless control for a switched reluctance machine having an estimator which develops a first machine rotor position estimate at a first position update rate and which develops a machine rotor speed estimate, position generation means coupled to the estimator for developing a second machine rotor position estimate at a second position update rate greater than the first position update rate, comprising:

a counter having a clock input responsive to a clock signal, an increment input and an output at which the second rotor position estimate is developed; and means responsive to at least one of the machine rotor speed estimate and the first machine rotor position estimate and coupled to the increment input of the counter for deriving an increment signal for the counter.

7. The position generating means of claim, 6, wherein the counter comprises a digitally controlled counter (DCC).

8. The position generating means of claim 7, wherein the deriving means includes means for summing the machine rotor speed estimate with an error signal representing a difference between the first and second machine rotor position estimates.

9. The position generating means of claim 8, wherein the DCC includes an accumulator having addition inputs and an output and wherein the output of the accumulator is coupled to one of the addition inputs and the other of the addition inputs receives the increment signal.

10. The position generating means of claim 9, further including means for preloading an initialization value into the counter.

\* \* \* \* \*